Patented Sept. 28, 1948

2,450,327

UNITED STATES PATENT OFFICE 2,450,327

HEAT-RESISTANT COATING COMPOSITION

Howard D. Cogan, Glenshaw, Pa., and Newton H. Ketcham, Flushing, N. Y., assignors to Carbide and Carbon Chemicals Corporation, a corporation of New York No Drawing. Application April 1, 1944, Serial No. 529,172

3 Claims. (Cl. 106—287)

This invention relates to the protection of metal surfaces and particularly those metal surfaces which are subjected to elevated temperatures for sustained periods of time. More especially, it concerns the protection of metal surfaces by means of heat-resistant coating compositions which are capable of adhering strongly to metal surfaces coated therewith without visible cracking, flaking, spalling or discoloration of the coating, even when exposed to elevated temperatures as high as 1350° F. intermittently or for prolonged periods of time.

Certain modifications of the invention effectively prevent deleterious corrosion and/or oxidation of metal surfaces at high temperatures for extended periods of time by providing such surfaces with a coating of heat- and corrosion-resistant inorganic materials bonded together to provide a strong homogenous heat-resistant film.

The more important objects of the invention are: to provide a novel highly adherent coating of heat-resistant inorganic materials upon metal surfaces normally subjected to high temperatures; to provide for the protection of metal articles from deleterious oxidation and corrosion when exposed to temperatures in the range of 500° F. to 1350° F.; and to provide a novel protective coating composition for metal surfaces, which coating is not subject to oxidation, hydrolysis and/or other chemical attack, and which exerts its protective action even at temperatures substantially exceeding 500° F. without decomposition and without losing its normal properties of toughness, mar-resistance, color fastness and resistance to divers organic solvents.

The invention has especial utility for the production from the lower alkyl esters of silicic acid and of condensed silicic acids, of coating compositions highly efficacious for the surface coating and protection of artillery gun tubes, machine gun barrels, metallic belt links, clips and magazines for packaging and feeding ammunition in automatic weapons, aircraft engine exhaust pipes, cylinder heads, and similar metal articles wherein corrosion and oxidation of the articles at their normal operating temperatures are severely damaging and where the burning off and flaking off of coating compositions heretofore used for camouflage and concealment purposes renders the latter completely useless in a short time.

All efforts heretofore to use organic substances as permanent protective coatings for articles normally exposed to temperatures of 700° F. and higher have been disappointing because of the inherent inability of the usual organic compounds to long resist the action of oxygen, water vapor and acidic gases at these temperatures.

The use of porcelain enamels and glasses as protective coatings for metal surfaces subjected to high temperatures has been seriously limited because such coatings are inherently brittle and are not shock-proof. They are subject to mechanical injury; and their thermal coefficients of expansion are seldom adjusted to that of the underlying metal so as to enable them to withstand sudden heating or chilling. Moreover, such coatings are applied as a slurry, the inorganic components of which must then be fused by the application of extremely high temperatures to the entire article. Such heating and fusing operations are not practical when applied to an assembled railroad locomotive, an artillery field piece or a completed automobile engine.

The use of silica depositing solutions, made by the controlled partial or complete hydrolysis of an aliphatic ester of a silicic acid, for coating and impregnating the surface of various porous materials for strengthening, stiffening, dressing or preserving them, or for the production of plastic masses, has long been known. When such solutions, alone or in admixture with suitable pigments and fillers, are applied to porous articles such as asbestos cement sheet, concrete, wood, and the like, some of the alkyl silicate, and colloidal silica formed by hydrolysis of the latter, remains on the surface of the article with the pigment when the solvent evaporates from the surface. In a later stage of the hydrolysis, the gel is converted to a hard film. In this stage the alkyl silicate plays an important part by reacting with moisture present in the mixture and by preventing the setting up of sudden stresses in the film during hardening of the silica gel.

When these coating compositions are applied to non-porous surfaces such as those of metal, they have consistently shown a marked tendency, after drying, to crack and flake off, especially when the article coated therewith is heated to temperatures around 700° F. or above.

According to one form of the present invention, there is applied to the properly cleaned and preferably phosphatized surface of the metal article a film or coating of a composition comprising a selectively partially hydrolyzed and hydrolytically condensed alkyl silicate film-forming vehicle having intimately mixed therewith (1) at least one thermally-stable material of the class hereinafter mentioned, having a fibrous or flaky structure, and capable of imparting to the film toughness and resistance to flaking and to cracking, and rendering the final composition strongly adherent to metal surfaces; and (2) an agent such as water for carrying out the desired hydrolysis of the alkyl silicate vehicle. The composition preferably also contains a quantity of one or more inorganic heat-resistant pigments having corrosion-inhibiting properties and of limited water solubility. As the so-applied coating air dries, further condensation of the alkyl silicate occurs in situ. The resulting air-dried coating then may be continuously subjected to temperatures in excess of 500° F. up to approximately 1350° F., without losing integrity and without manifesting any deleterious failure of the coating due to oxidation, hydrolysis, or other cause. Flaking, spalling, powdering, chipping, or other failure resulting from loss of adhesion to the metal surfaces are avoided.

The active vehicles present in the protective compositions of this invention may be designated as the hydrolytically highly condensed lower alkyl esters of silicic acids. It has been established that, concurrently with the progressive hydrolysis of an alkyl ester of a silicic acid—e. g., tetra-ethyl silicate—a progressive condensation of the resultant partially hydrolyzed ester occurs with the production of a series of condensed lower alkyl esters. These hydrolysis and condensation reactions may continue after the application to a surface of a paint composition containing the same.

Although the desired degree of hydrolytic condensation may be achieved by a one-step treatment, it is highly advantageous to carry out the hydrolysis in two steps in order to maintain at all stages thereof homogeneous comparatively stable solutions of maximum silica concentrations. In the first hydrolysis step the alkyl silicate is mixed with a small amount of water (or a dilute solution of a mineral acid), and a mutual solvent for the ethyl silicate and water, such as "Synasol." This yields a stable solution in which the alkyl silicate and condensed silicates are only slightly hydrolyzed. Such solution must stand for 6 to 24 hours or longer before further water is added in a second hydrolysis step. As the hydrolytic condensation progresses in the slightly hydrolyzed solution the latter becomes capable of mixture with the additional water required to bring it to a useful state without loss of homogeneity. The optimum amount of water useful for the first hydrolysis step is around 10% by weight based upon the silica content of the starting ethyl silicate. In the second hydrolysis step the water is added preferably in amount approximately corresponding to or less than that required to complete the hydrolysis of the partially hydrolyzed ester from the first step, and advantageously around 5% to 10% by weight of the partially hydrolyzed ester.

The primary hydrolysis to form the partially hylrolyzed alkyl silicate is advantageously accomplished with water rendered slightly acid with hydrochloric acid. (Other inorganic acids such as phosphoric acid or sulfuric acid may be used.) The partially hydrolyzed ester vehicle base may be prepared by merely mixing the ester and water or acidulated water, and usually a mutual solvent such as ethyl alcohol, at room temperature.

In the preparation of the final composition this vehicle base is further selectively hydrolyzed with added water, and is then mixed with the other ingredients. If desired, the vehicle base may be mixed with the premixed pigment, film-bonding agent and water sufficient to complete the hydrolysis of the ester. This former procedure is preferred when aluminum bronze—or pigments of an alkaline nature, such as zinc oxide—are used. In either case, the composition should stand for at least 6 hours and desirably for 12 hours after addition of water to allow the desired hydrolysis to take place before application as a coating.

The partially hydrolyzed alkyl silicate preferably is present in the composition in sufficient amount to give the latter a silica ($SiO_2$) content between 25% and 40%, or more, based on the total solids of the composition.

Our experiments have established that the presence in the coating composition of at least 10% by weight, and commonly 25% to 40%, based on the total solids, of a finely divided heat-stable adhesion-promoting inorganic material having either a fibrous or a flaky or foliated structure, such as the various types of asbestos— e. g., pulverized asbestos, wooly asbestos, micronized asbestos, and asbestine; finely divided micas such as powdered and flake micas; talcs; and graphite; is essential to insure film integrity and permanent adhesion of the film or coating to the metal surface when the coated article is subjected to temperatures exceeding 700° F. Asbestos and talc, respectively, are fibrous and flaky or platelike foliated forms of magnesium silicates; while micas are principally foliated forms of silicates of aluminum. The addition of one or more of these materials to silicate paint compositions greatly increases the adhesion of the paint to metal surfaces, and permits heating of such coated surfaces to redness without visible cracking or peeling or discoloration of the coating, provided any pigments used in the compositions are heat-resistant. Indeed, metal articles coated with the silicate paints of the invention have withstood heating for two hours at 700° F. without any loss of adhesion.

Of these foliated and fibrous adhesion-promoting agents, finely divided or pulverized mica and asbestos provide outstanding results. Graphite and talc are less satisfactory. Non-foliated and non-fibrous materials such as kaolin, bentonite and a dehydrated silica gel are ineffective in these compositions.

For improving the corrosion-resistance of the novel coating composition, it is highly desirable to incorporate therein a heat-resistant corrosion-inhibitive pigment having low water solubility, in amount up to 50% or more of the weight of the adhesion-promoting material. This class of pigments is well known to the paint industry. Typical examples thereof are zinc oxide, commercial zinc yellow, aluminum bronze, chrome oxide green, chrome green, red lead, basic lead sulphate, lead chromate, basic lead chromate ("chrome orange"), barium chromate and strontium chromate. Many of these inhibitive pigments also possess desirable color-conferring properties.

There may also be incorporated in the composition other pigments for coloring purposes. Such pigments must possess heat-stability and color fastness under prolonged heating at the temperature mentioned, and must be approximately free from water and water-soluble components. Organic colors and earth pigments carrying combined water, such as yellow ochre and the siennas, are not suitable. Among pigments useful in the composition are light chrome yellow, white lead, zinc chromate, lamp black, barytes, titanium dioxide, barium titanate and red iron oxide.

Where a high degree of corrosion-resistance is to be imparted to surfaces of steel or other metal subject to attack by corrosive influences, such surfaces preferably are phosphatized in well-known manner prior to the application of the coating composition. The ideal surface is one that has been freshly sandblasted or etched by pickling, followed by a corrosion-inhibitive phosphoric acid treatment. Ferrous metal surfaces which have been cleaned and phosphatized, typically by any of the methods described in United States Patents Nos. 1,167,966; 1,206,075; 1,215,463; 1,219,526 and 2,208,524, provide superior bases for application of the present highly adherent heat-resistant coating composition.

While the tetra-ethyl orthosilicates and condensed ethyl silicates such as ethyl disilicate are the preferred silicic acid esters employed as starting materials in making the composition of the invention, other lower alkyl esters of silicic acids may also be used, such as the methyl silicates, propyl silicates and butyl silicates; and the condensed lower monohydric alcohol silicates, such as methyl disilicate, ethyl disilicate, ethyl trisilicate and ethyl tetrasilicate.

While excellent paints suitable for the coating of surfaces of metal conveniently contain at least partially hydrolyzed alkyl silicate, the adhesion-promoting substance and the pigment in approximately the ratio to provide equal proportions by weight of silica ($SiO_2$), of said adhesion-promoting substance, and of the pigment, other proportions of the ingredients may be employed with good results, providing the adhesion-promoting substance forms at least 10% of the total solids of the paint.

The following examples serve to illustrate the invention. In the examples all parts are given by weight unless otherwise specified.

*Example I*

100 parts of a partially hydrolyzed ethyl silicate solution containing around 34% silica were mixed with 5 parts of a 0.3% aqueous hydrochloric acid solution, 25 parts of toluene, 40 parts of titanium oxide, and 40 parts of a pulverized mica, and the mixture was ground in a pebble mill. The said partially hydrolyzed silicate solution was prepared by mixing 80 volumes of a mixture of ethyl silicates containing about 40% of combined silica, 18 volumes of a denatured ethyl alcohol, and 2 volumes of 0.06% aqueous hydrochloric acid solution. This was made up a day in advance of its use. The toluene served to adjust the viscosity of the composition for brushing and spray-coating but served no other purpose.

The final paint mixture containing the hydrolytically highly condensed ethyl silicate was allowed to stand six hours before using. A clean steel panel was then coated with the composition. It dried overnight at room temperature to a hard film. It was then heated to redness. The dried film was unaffected, retaining excellent adhesion and hardness. (Five parts of water may be substituted for the five parts of dilute hydrochloric acid in this composition with practically identical results.)

In the case of an identical panel which was coated with a similar composition wherein 40 additional parts of titanium dioxide were substituted for the pulverized mica, and the paint dried for 42 hours at room temperature, the paint cracked and flaked away from the steel upon heating to redness. This is characteristic of the action of alkyl silicate paints which do not embody the present invention when applied to steel and other metal surfaces.

*Example II*

A paint was prepared by mixing together 5 parts by weight of a 0.3% aqueous hydrochloric acid solution, 40 parts titanium dioxide, 40 parts of pulverized high temperature asbestos and 100 parts of the partially hydrolyzed solution of ethyl silicates described in Example I. The ethyl silicate solution was made up at least a day in advance of its use. The paint composition was ground in a pebble mill and was then painted on a clean steel panel. The paint dried hard overnight, providing a strongly adherent coating on the panel. After heating the panel to redness in an open flame, the paint retained its adhesion to the panel.

*Example III*

A paint composition was prepared in manner similar to that described in Example I, except that 40 parts of graphite were substituted for the pulverized mica. After the composition had stood for seven hours, a steel panel was coated therewith. The coating dried overnight. Thereafter it was heated strongly to redness without destroying the strong adhesion of the paint to the steel. Other heat-resistant pigments may be substituted for the titanium dioxide.

It is advantageous in the production of the coating compositions of the invention to first prepare mixed pigment pastes by grinding the pigments in 95% ethanol in a ball mill to form a slurry. This may be stirred into the silicate solution at least six hours after final addition of water and preferably just before use of the composition.

*Example IV*

10 parts of a hydrolytically condensed ethyl silicate solution containing around 32% of silica, 3 parts of zinc oxide and 3 parts of "Micatone B–1000" were mixed to form a paint. Such silicate solution was made by mixing 5 volumes of water with 100 volumes of the partially hydrolyzed ethyl silicate solution described in Example I, after permitting the latter to stand for over six hours. A clean steel panel was coated with the paint and, after drying, was exposed to air at 100% humidity and about 45° C. for 86 days. The coating adhered well to the metal and provided good protection against corrosion.

A paint composition made in generally similar manner excepting that the zinc oxide was replaced with zinc yellow (zinc chromate), gave very similar results when applied to a steel panel and exposed to water vapor for 18 days.

*Example V*

A partially hydrolized ethyl silicate solution was prepared by mixing 80 volumes of a mixture of ethyl silicates containing about 40% of combined silica, 18 volumes of denatured ethyl alcohol, and 2 volumes of a 0.3% aqueous solution of hydrochloric acid. This mixture was made up at least one day in advance of use. Paints were prepared from the solution by adding to 100 parts thereof 5 parts of water, 40 parts of micronized mica, and 40 parts of a heat-stable corrosion-resistant pigment. Chrome oxide green and aluminum bronze were the pigments employed in different paint compositions. About 25 parts of toluene were added to give the proper consistency for spraying. Six to twelve hours after the mixing of the silicate solution, pigments, water and toluene, clean steel panels were coated therewith. The panels then were heated over a direct flame after the coatings had thoroughly dried at room temperature. The coatings adhered tenaciously to the steel and were not injured by the flames.

*Example VI*

A stable, partially hydrolyzed ethyl silicate solution was prepared by mixing 80 volumes of a mixture of ethyl silicate containing about 40% silica, 20 volumes of denatured ethyl alcohol, and 2 volumes of water. To 15 parts of this solution, which had been made up several weeks previously, was added 0.75 part of water, and hydrolysis was allowed to proceed for about 24 hours. A paint composition was prepared by intimately mixing this hydrolytically highly condensed ethyl silicate solution with 20 parts of a pigment paste containing 4.5 parts titanium dioxide, 4.5 parts of finely divided talc and 11 parts of denatured ethyl alcohol. This paint composition was applied to clean steel panels and allowed to dry at room temperature. The coating was quite adherent to the metal when heated to moderate temperatures over a direct flame. However, talc, while improving the adhesion of alkyl silicate paints to metal surfaces at normal and elevated temperatures, is not as effective for the purpose as the micas and asbestos.

The application of the novel coating composition of this invention to ferrous metal surfaces which previously have been given a phosphatizing treatment, results in a unique protective performance under conditions where prior-known compositions are demonstrably inapplicable.

*Example VII*

A mixture of 35 parts of a partially hydrolyzed ethyl silicate solution like that described in Example I, 14 parts of a micronized mica, 3 parts of aluminum bronze, 1.75 parts of water and about 8.5 parts of toluene were ground in a pebble mill to yield a smooth suspension. After standing for 24 hours this paint was applied to a clean steel panel and to a panel of phosphatized steel. After drying for a day at room temperature the panels were heated. The coatings adhered strongly to the metal surfaces even after being highly heated. Upon subsequent exposure of the coated panels to steam the coated phosphatized steel panel provided superior resistance to corrosive influences.

The outstanding utility of our protective method and composition is obvious. Even where maximum corrosion-resistance is required, the surface to be protected need only be thoroughly cleaned and phosphatized. The premixed coating composition is then applied and allowed to air dry. Within the next four hours the coating "sets" completely, and is thereafter substantially insoluble in organic solvents, water, greases, oils, and divers other liquids. As the coated surface attains the elevated temperatures at which the article normally operates, the desirable properties of hardness, solvent-resistance, toughness and opacity are still further enhanced. Thus, metal articles having phosphatized surfaces coated with the composition are continuously protected against corrosive and oxidizing influences, even at temperatures exceeding 500° F. and approaching 1350° F.

By the term "lower alkyl ester of orthosilicic acid" we mean to include any alkyl ester of orthosilicic acid in which each alkyl group contains 4 carbon atoms or less. The term "alkyl ester" is intended to include mixtures of any or all of the foregoing esters as well as the individual esters.

The term "a hydrolytically highly condensed lower alkyl ester of a silicic acid" and similar terms appearing in the claims are intended to designate the product formed by the concurrent controlled hydrolysis and condensation of a lower alkyl ester of a silicic acid regardless of whether the hydrolysis is effected in one stage or in a plurality of stages.

We claim:

1. A heat resistant coating composition strongly adherent to non-porous metal surfaces and adapted to protect phosphatized metal surfaces normally subjected to temperatures ranging from 500° F. to around 1350° F., which composition comprises (1) a partially hydrolyzed lower alkyl ester of a silicic acid in which each of the alkyl groups contains no more than four carbon atoms; (2) between 10% and 40% by weight, based on the total solids content of the composition, of finely divided mica; (3) water in amount approximately completing the hydrolysis of said partially hydrolyzed ester and providing a mixture of highly condensed esters by the hydrolytic condensation of said partially hydrolyzed and condensed ester; and (4) a heat-resistant corrosion-inhibitive inorganic pigment.

2. A heat-resistant coating composition strongly adherent to non-porous surfaces of metal and the like without visible cracking, flaking, spalling or discoloration of the coating when exposed to elevated temperatures as high as 1350° F., and adapted to be applied to phosphatized metal surfaces normally subjected to temperatures within the range from 500° to 1350° F., which composition comprises (1) a partially hydrolyzed and condensed lower alkyl ester of a silicic acid in which each of the alkyl groups contains no more than four carbon atoms; (2) between about 25% and about 40% by weight of mica, based on the total solids content of the composition; and (3) water in amount providing a mixture of highly condensed esters by the condensation of said partially hydrolyzed and condensed ester and approximately completing the hydrolysis of said highly condensed esters.

3. A heat-resistant coating composition strongly adherent to non-porous surfaces of metal and the like without visible cracking, flaking, spalling or discoloration of the coating when exposed to elevated temperatures as high as 1350° F., and adapted to be applied to phosphatized metal surfaces normally subjected to temperatures within the range from 500° to 1350° F., which composition comprises (1) a partially hydrolyzed and condensed lower alkyl ester of a silicic acid in which each of the alkyl groups contains no more than four carbon atoms; (2) between about 25% and about 40% by weight of asbestos, based on the total solids content of the composition; and (3) water in amount providing a mixture of highly condensed esters by the condensation of said partially hydrolyzed and condensed ester and approximately completing the hydrolysis of said highly condensed esters.

HOWARD D. COGAN.
NEWTON H. KETCHAM.

(References on following page)

REFERENCES CITED

The following references are of record in the file of this patent:

UNITED STATES PATENTS

| Number | Name | Date |
|---|---|---|
| 1,809,755 | King et al. | June 9, 1931 |

OTHER REFERENCES

King, "Silicon Ester as a Paint Medium," Paint Manufacture, May 1931, pages 52 to 55.

Draper, "Mica as a Paint Pigment and Extender," Paint Manufacture, Dec. 1942, pages 224 to 225.